United States Patent [19]

Lambert et al.

[11] Patent Number: 5,259,948
[45] Date of Patent: Nov. 9, 1993

[54] HYDROCARBON CONVERSION PROCESS USING A NOVEL SILICON ENHANCED AMORPHOUS SILICA-ALUMINA

[75] Inventors: Susan L. Lambert, Rolling Meadows; Michael W. Schoonover, Arlington Heights, both of Ill.

[73] Assignee: UOP, Des Plaines, Ill.

[21] Appl. No.: 940,412

[22] Filed: Sep. 3, 1992

Related U.S. Application Data

[63] Continuation-in-part of Ser. No. 692,755, Apr. 29, 1991, Pat. No. 5,160,493.

[51] Int. Cl.$^5$ .................. C10G 11/08; C10G 47/08; C07C 2/70
[52] U.S. Cl. .................. 208/111; 208/115; 585/323; 585/463
[58] Field of Search .................. 208/117, 111, 115; 585/323, 463; 502/231

[56] References Cited

U.S. PATENT DOCUMENTS

| | | | |
|---|---|---|---|
| 2,483,131 | 9/1949 | Garrison | 252/441 |
| 2,620,314 | 2/1952 | Hoekstra | 252/448 |
| 2,928,785 | 3/1960 | Hirschler | 208/117 |
| 3,205,277 | 9/1965 | Pollitzer et al. | 585/323 |
| 3,274,124 | 9/1966 | O'Hara | 252/451 |
| 3,909,450 | 9/1975 | O'Hara | 252/438 |
| 4,310,440 | 1/1982 | Wilson et al. | 252/435 |
| 4,422,959 | 12/1983 | Lawson et al. | 502/247 |
| 4,440,871 | 4/1984 | Lok et al. | 502/214 |
| 4,503,023 | 3/1985 | Breck et al. | 423/328 |
| 4,576,711 | 3/1986 | Ward et al. | 208/111 |
| 4,588,701 | 5/1986 | Chiang et al. | 502/65 |
| 4,591,576 | 5/1986 | Chiang et al. | 502/65 |
| 4,597,956 | 7/1986 | Hinchey et al. | 423/328 |
| 4,610,856 | 9/1986 | Skeels et al. | 423/328 |
| 4,711,770 | 12/1987 | Skeels et al. | 423/328 |
| 4,753,910 | 6/1988 | Han et al. | 502/85 |
| 4,806,513 | 2/1989 | McDaniel et al. | 502/107 |
| 4,868,147 | 9/1989 | Pearson et al. | 502/231 |
| 4,870,222 | 9/1989 | Bakas et al. | 585/323 |
| 5,008,233 | 4/1991 | Lambert | 502/231 |

OTHER PUBLICATIONS

"Zeolite Chemistry V–Substitution of Silicon for Aluminum in Zeolites via Reaction with Aqueous Fluorosilicate" published at p. 87 of *Proceedings of 6th International Zeolite Conference,* 1983, edited by David Olson; Buterworth, Guildford, U.K.

"Faujasites Dealuminated with Ammonium Hexafluorosilicate: Variables Affecting the Method of Preparation" by G. Garralon et al. appearing at p. 268 of *Zeolites,* vol. 8, Jul., 1988.

Inside cover of Merck Index, 11th Edition, (1989), published by Merck & Co., Rayway, N.J., U.S.A.

*Primary Examiner*—Carl F. Dees
*Attorney, Agent, or Firm*—Thomas K. McBride; Eugene I. Snyder; Frank S. Molinaro

[57] ABSTRACT

This invention relates to a hydrocarbon conversion processes, e.g., hydrocracking, cracking, alkylation, etc., using a silicon enhanced amorphous silica-alumina (SEASAL) composition. The composition is characterized in that from about 3 to about 22 mole percent of the aluminum atoms in a host amorphous silica-alumina have been replaced by silicon atoms. Additionally, the SEASAL contains from about 0.5 to about 10 weight percent fluoride and has a cracking activity of at least 30%. The SEASAL is prepared by reacting a host amorphous silica-alumina with a fluorosilicate salt, thereby removing aluminum atoms and inserting silicon atoms.

6 Claims, No Drawings

HYDROCARBON CONVERSION PROCESS USING A NOVEL SILICON ENHANCED AMORPHOUS SILICA-ALUMINA

CROSS REFERENCE TO RELATED APPLICATION

This application is a continuation-in-part of copending U.S. patent application Ser. No. 07/692,755 filed on Apr. 29, 1991 now U.S. Pat. No. 5,160,493.

BACKGROUND OF THE INVENTION

Amorphous silica-alumina is a well known composition that has uses in catalyzing hydrocarbon conversion processes and as a support for catalytic metals. One way of preparing such a composition is to separately form sols of aluminum and silicon, mix the sols together and then gel the sols by the oil drop method and dry the resultant particles to provide an amorphous silica-alumina composition. Such a procedure is described in U.S. Pat. No. 3,909,450. Other methods include coprecipitation as described in U.S. Pat. No. 3,274,124.

Applicants have found that amorphous silica-alumina compositions can be modified by reacting the amorphous silica-alumina composition with a fluorosilicate salt to remove some of the aluminum atoms in the amorphous silica-alumina and replace them with silicon atoms. This silicon enhanced amorphous silica-alumina (SEASAL) composition has increased acidity as shown by the fact that it has increased cracking activity. The increase in activity is considerably greater than if an amorphous silica-alumina composition were prepared with a greater silicon content. That is, the silicon that is added by the fluorosilicate salt is different from the silicon in the host amorphous silica-alumina. The SEASAL also contains fluoride.

Several references in the prior art deal with materials that have been treated with fluorosilicate salts. For example, U.S. Pat. No. 4,576,711 discloses reacting a Y-zeolite with an aqueous solution of ammonium hexafluorosilicate to remove some of the framework aluminum atoms and replace them with silicon. Similarly, U.S. Pat. No. 4,503,023 discloses the dealumination of zeolite LZ-210 with silicon substitution.

U.S. Pat. No. 4,753,910 discloses using a water soluble fluoride during or after the aluminum removal step in order to solubilize the aluminum fluoride which is produced during the aluminum removal (dealumination) step.

U.S. Pat. No. 4,711,770 discloses inserting silicon atoms into the crystal lattice of an aluminosilicate zeolite by contacting the zeolite with a fluoro-silicate salt at a pH of about 3 to 7 and at a rate to preserve at least 60% of the crystallinity of the zeolite. This patent also discloses materials which have defect sites in the framework.

U.S. Pat. No. 4,597,956 discloses a method of removing aluminum fluoride byproducts by contacting the aluminosilicate with a soluble aluminum compound such as aluminum sulfate.

U.S. Pat. Nos. 4,591,576 and 4,588,701 are companion cases which describe a catalyst containing a zeolite and an inorganic oxide matrix. The inorganic oxide matrix may be amorphous oxides such as silica, alumina, silica-alumina, silica-zirconia, silica-magnesia, alumina-boria, alumina-titania, etc. The catalyst is treated with a fluorosilicate salt to control the sodium oxide content of the catalyst. The patentees mention that separate treatment of the zeolite and inorganic oxide matrix with subsequent mixture is not desirable.

U.S. Pat. No. 4,806,513 discloses a support which is alumina having a surface coating of silica which can be treated with fluorine.

U.S. Pat. No. 2,483,131 discloses impregnating alumina or mixtures of alumina/silica/zirconia with silicon tetrafluoride.

Finally, U.S. Pat. No. 5,008,233 discloses treating a crystalline alumina with a fluorosilicate salt to give a silicon substituted alumina in which the silicon concentration is non-homogeneous.

Comparing this prior art with the instant invention, it is observed that none of the prior art discloses that it would be beneficial to remove aluminum atoms from an amorphous silica-alumina and replace them with silicon. The resultant SEASAL has at least 30% cracking activity (as defined herein) which is different from other amorphous silica-aluminas known in the prior art.

SUMMARY OF THE INVENTION

This invention relates to a hydrocarbon conversion process using a novel catalyst. The process comprises contacting a hydrocarbon under hydrocarbon conversion conditions with a catalyst to give a hydroconverted product, the catalyst consisting essentially of a silicon enhanced amorphous silica-alumina (SEASAL) composition characterized in that a host amorphous silica-alumina composition has been modified such that from about 3 to about 22 mole percent of the aluminum atoms in the host amorphous silica-alumina have been replaced by silicon atoms and the SEASAL contains from about 0.5 to about 10 weight percent fluoride and has a cracking activity of at least 30%.

Other objects and embodiments will become more apparent after a more detailed description of the invention.

DETAILED DESCRIPTION OF THE INVENTION

As stated, this invention relates to a hydrocarbon conversion process using a silicon enhanced amorphous silica-alumina (SEASAL). Accordingly, one necessary part of the invention is a SEASAL material.

The host silica-alumina is an amorphous silica-alumina which can be prepared by means well known in the art. For example, the procedure set forth in U.S. Pat. No. 3,909,450, which is incorporated by reference, may be used. This procedure involves making an aluminum sol by digesting aluminum in an aqueous hydrochloric acid solution at reflux temperature to form a sol with a predetermined aluminum/chloride ratio. This aluminum sol is mixed with a silicon sol which has been prepared, for example, by the acidification of water glass. Gelling agents such as hexamethylenetetraamine, urea or mixtures thereof are added and the sol mixture dispersed as droplets in a hot oil bath where gelation occurs with the formation of spheroidal particles. The gelling agent releases ammonia which sets the alumina and silica. The spheres are then continuously withdrawn from the oil bath and typically subjected to specific aging and drying treatment in oil and an ammoniacal solution to further improve their physical characteristics. The resulting aged and gelled particles are then washed and dried at a relatively low temperature of about 93° C. to about 149° C. (200°–300° F.) and subjected to a calcination procedure at a temperature of about 400° C. to about 704° C. (752°–1300° F.) for a period of about 1 to about 20 hours. This provides an amorphous silica-alumina composition. These amorphous silica-alumina compositions are characterized in that they have an apparent bulk density of about 0.3 to about 0.5 g/cc, an average pore diameter between about 20 and about 100 Angstroms and a pore volume of about 0.4 to about 1.0 cc/g. Greater details regarding the oil drop method may be found in U.S. Pat. No. 2,620,314 which is incorporated by reference.

Although the above procedure provides the amorphous silica-alumina composition in the form of spheres, the amorphous silica-alumina may be in any form such as powder, extrudate, irregularly shaped particles, pills, spheres, etc. For ease of solids handling, it is preferred to treat shaped supports such as pellets, spheres, extrudates, rings, irregularly shaped particles, etc. It is especially preferred to use spheres prepared as described above.

The amorphous silica-alumina material can have a wide range of silica (silicon oxide) and alumina (aluminum oxide) content. Generally the silica content varies from about 20 to 90 weight percent while the alumina content varies from about 80 to about 10 weight percent. Preferably the silica content varies from about 50 to about 80 weight percent and the alumina content varies from about 50 to about 20 weight percent.

The SEASAL composition can be prepared by using the same general conditions and aqueous solutions used to remove aluminum and insert so-called "extraneous" silicon into zeolites. These conditions are set forth in U.S. Pat. Nos. 4,597,956; 4,711,770 and 4,753,910. Other references which address silicon substitution in zeolites are "Zeolite Chemistry V-Substitution of Silicon for Aluminum in Zeolites via Reaction with Aqueous Fluorosilicate" published at page 87 of *Proceedings of 6th International Zeolite Conference*, 1983, edited by David Olson; Butterworth, Guildford, U.K.; "Faujasites Dealuminated with Ammonium Hexafluorosilicate: Variables Affecting the Method of Preparation" by G. Garralon et al. appearing at page 268 of *Zeolites*, Vol. 8, July 1988; and U.S. Pat. No. 4,610,856. All these references are incorporated by reference for their teaching of methods of silicon insertion, which may be adapted to the instant case of amorphous silica-alumina.

Accordingly, the process involves contacting the host amorphous silica-alumina with an aqueous solution of a fluorosilicate salt. Fluorosilicate salts that can be used are any of those described in the references enumerated above. For example, alkylammonium, ammonium, sodium, etc. can be the balancing cation. It is preferred to use ammonium hexafluorosilicate because of its solubility in water. The contacting is carried out at a temperature of about 10°–125° C. and preferably 20° to 95° C., with sufficient pressure to maintain liquid phase conditions. The pH of the solution should be in the range of about 3 to about 7 and preferably from about 5 to about 7. The amount of ammonium hexafluorosilicate (AFS) which is added can vary considerably, and is dependent on the amount of aluminum in the host silica-alumina. Usually the amount of AFS that is added is equal to from about 6 to about 22 mole percent of the aluminum in the host silica-alumina.

Typically the reaction is carried out by adding the solution of ammonium hexafluorosilicate to a slurry of the silica-alumina to be treated. The addition can be carried out incrementally or continuously at a slow rate over a period of 30 minutes to 8 hours but preferably over a period of about 30 minutes to 120 minutes. After the fluorosilicate solution has been added, the resultant mixture is stirred for an additional amount of time ranging from about 1 to about 4 hours and preferably from about 1 to about 2 hours. The resultant mixture is composed of the SEASAL material, an insoluble by-product powder and a liquid phase. When the starting silica-alumina is in the form of a shaped support such as spheres, the SEASAL material can be separated from the insoluble by-product powder by ordinary physical means. However, when the starting silica-alumina is in the form of a powder or small particulates, it is difficult to physically separate the desired product from the undesirable by-product. In this case, the combined solids are washed with a soluble aluminum salt, preferably aluminum sulfate which solubilizes the by-product powder (which is primarily $NH_4AlF_4$). After the SEASAL product is isolated, it is washed with water at a temperature of about 25° to about 50° C. and then dried at a temperature of about 100° to about 120° C. for a time of about 4 to about 24 hours.

The reaction which takes place between the fluorosilicate salt and the amorphous silica-alumina involves the removal of aluminum atoms and replacement by silicon atoms. It is desired to replace from about 3 to about 22 mole percent of the aluminum atoms in the host amorphous silica-alumina with silicon atoms and preferably from about 10 to about 14 mole percent of the aluminum atoms should be replaced.

It should be pointed out that not all of the silicon which is present in the reaction mixture is incorporated into the amorphous silica-alumina. That is, the reaction is not necessarily 100% efficient. A complete mass balance of the reaction has shown that the majority of the fluoride ions are found in the fines as $NH_4AlF_4$ (when shaped supports are used) and the reaction liquid as $NH_4F$, with a small quantity of fluoride ions associated with the SEASAL product.

The amount of fluoride on the SEASAL composition varies from about 0.5 to about 10 weight percent with a portion present to charge balance the silicon and a portion present as ammonium fluoride. The ammonium fluoride is removed by calcination at 400° C. or higher.

The SEASAL composition is also characterized by its acidity. Acidity of an oxide can be measured by several well known methods such as ammonia temperature programmed desorption and cracking of hydrocarbons. Since cracking occurs at acid sites of the composition, the greater the ability to crack hydrocarbons, the greater the acidity of the material. In the instant case the SEASAL compositions exhibit at least 30% cracking activity in a 1-heptene cracking test as described in Example 1. In the 1-heptene test, cracking is defined as the weight percent of the product that has a lower molecular weight than the starting 1-heptene.

The SEASAL materials of this invention find application as hydrocarbon conversion catalysts either as is or after dispersion of catalytic metals thereon. Hydrocarbon conversion processes are well known in the art and include cracking, hydrocracking, alkylation of both aromatics and isoparaffins, isomerization, polymerization, reforming, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are well known in the art. For example, U.S. Pat. Nos. 4,310,440 and 4,440,871 disclose the conditions for the above-named processes and are incorporated by reference. Of the processes enumerated above, the SEASAL materials are particularly suited for hydrocracking, cracking, and alkylation (especially aromatic alkylation).

Hydrocracking conditions typically include a temperature in the range of 400° to 1200° F. (204°–649° C.), preferably between 600° and 950° F. (316°–510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178–8,888 std. $m^3/m^3$), preferably between 2,000 and 30,000 scf per barrel of charge (355–5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with SEASAL compositions using feedstocks such as gas oils, heavy naphthas, deasphalted crude oil residua, etc. with gasoline being the principal desired product. Temperature conditions of 850° to 1100° F., LHSV values of 0.5 to 10 and pressure conditions of from about 0 to 50 psig are suitable.

Alkylation of aromatics usually involves reacting an aromatic ($C_6$ to $C_{12}$), especially benzene, with a monoolefin to produce a linear alkyl substituted aromatic. The process is carried out at an aromatic: olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig. Further details on apparatus may be found in U.S. Pat. No. 4,870,222 which is incorporated by reference.

The SEASAL materials of this invention may have dispersed thereon catalytic metals well known in the art and may be prepared according to the procedure in U.S. Pat. No. 4,422,959 which is incorporated herein by reference. Specifically, one or more metal selected from the group consisting of metals of Group VIII and Group VI-B of the periodic table as shown on the inside cover of the Merck Index, 11th Edition, (1989) published by Merck & Co., Rahway, N.J., U.S.A. The SEASAL materials may also be combined with zeolites, clays, etc. in order to prepare a hydrocracking catalyst.

The following examples are presented in illustration of this invention and are not intended as undue limitations on the generally broad scope of the invention as set out in the appended claims.

EXAMPLE 1

Heptene Cracking Test

The following test procedure was used to evaluate the materials prepared in Examples 2 to 8. The heptene cracking test or the microreactor cracking test uses an electrically heated reactor which is loaded with 125 mg of 40–60 mesh (420–250 microns) particles of the catalyst to be tested. Each catalyst was dried in situ for 30 minutes at 200° C. using flowing hydrogen, and then subjected to a reduction treatment of 550° C. in flowing hydrogen for one hour. The temperature of the reactor was then adjusted to 425° C. (inlet). The feed stream used to test the catalyst consists of hydrogen gas which is saturated with 1-heptene at 0° C. and atmospheric pressure. The feed stream was flowed over the catalyst at a flow rate of 500 cc/min. The effluent gas stream was analyzed using a gas chromatograph. What is reported in the examples that follow is weight percent cracked product and selectivity for $C_3+C_4$. Cracked product is product that has a lower molecular weight than the starting 1-heptene hydrocarbon. Thus, the weight percent cracked product represents the cracking activity of the composition.

EXAMPLE 2

A sample of amorphous silica-alumina oil dropped spheres (15.01 g), having a composition of 25% $SiO_2$/75% $Al_2O_3$, was slurried in 100 g deionized water and heated to 82° C. A separate solution of ammonium hexafluorosilicate (3.51 g) in deionized water (21.25 g) was added to this heated slurry in a dropwise manner over the course of 38 minutes. After the addition was completed the reaction mixture was digested at 80° C. for 2 hours, with stirring. The pH of the reaction mixture was eight. The reaction liquid and fines were decanted from the spherical support. The spheres were loaded in an upflow washing column, washed with 10 liters of deionized water at room temperature, dried at 100° C. overnight and then calcined at 500° C. for five hours in a muffle oven. The catalytic activity of this material was evaluated in the 1-heptene microreactor of Example 1 using 125 mg of sample. This sample cracked 59.61 weight percent of the feed.

EXAMPLE 3

A sample of amorphous silica-alumina oil dropped spheres (15.00 g), having a composition of 25% $SiO_2$/75% $Al_2O_3$, was slurried in 100 g deionized water and heated to approximately 80°–90° C. A separate solution of ammonium hexafluorosilicate (3.50 g) in deionized water (21.01 g) was added to this heated slurry in a dropwise manner over the course of 53 minutes. After the addition was completed the reaction mixture was digested at 80° C. for 1 hour, with stirring. The reaction liquid and fines were decanted from the spherical support. The spheres were loaded in an upflow washing column, washed with 10 liters of deionized water at room temperature, dried at 100° C. overnight and then calcined at 500° C. for five hours in a muffle oven. The catalytic activity of this material was evaluated in the 1-heptene microreactor test of Example 1 using 125 mg of sample. This sample cracked 59.67 weight percent of the feed. The fluoride content of this material was 5.95 mass percent.

EXAMPLE 4

A sample of amorphous silica-alumina oil dropped spheres (20.02 g), having a composition of 67% $SiO_2$/33% $Al_2O_3$, was slurried in 200 g deionized water and heated to 83° C. A separate solution of ammonium hexafluorosilicate (2.45 g) in deionized water (40.00 g) was added dropwise to the above slurry over the course of 32 minutes. The reaction mixture was then digested at 80° C. for an additional 60 minutes. During the digestion period, the pH of the reaction mixture rose from 4.0 to 5.5. The reaction liquid and fines were decanted from the spheres, the spheres were washed with ten liters of room temperature deionized water in an upflow washing column, dried at 100° C. overnight and then calcined at 500° C. in a muffle oven for two hours. The evaluation of this sample in the 1-heptene test of Example 1 showed 40.12 weight percent cracking. This sample contained 2.42 mass percent F.

EXAMPLE 5

A buffered solution was prepared by dissolving glacial acetic acid (15.71 g) and sodium acetate trihydrate (2.72 g) in 185 g deionized water and diluting to a total volume of 200 cc. The pH of this buffer was 3.5. A sample of amorphous silica-alumina oil dropped spheres (20.02 g), having the composition 67% $SiO_2$/33% $Al_2O_3$, was added to this buffered solution. This slurry was stirred and heated to 77° C. A solution of ammonium hexafluorosilicate (2.45 g) in deionized water (40.0 g) was added dropwise to this slurry over the course of 33 minutes. The reaction mixture was subsequently digested at 85° C. for one hour. The reaction liquid and fines were decanted, the spheres washed in an upflow washing column using 10 liters of room temperature, deionized water, dried at 100° C. overnight and then calcined at 500° C. for 2 hours. This sample contained 0.72 mass percent fluorine and showed 53.83 weight percent cracking in the 1-heptene test of Example 1.

EXAMPLE 6

A sample of amorphous silica-alumina oil dropped spheres (130.03 g), having the composition 67% $SiO_2$/33% $Al_2O_3$, was slurried in 1300 g deionized water and heated to 81° C. A separate solution of ammonium hexafluorosilicate (15.91 g) in deionized water (260.01 g) was added dropwise to the above slurry over the course of 65 minutes. The reaction mixture was then digested at 85° C. for an additional 63 minutes. The reaction liquid and fines were decanted from the spheres. The spheres were washed with 20 liters of room temperature deionized water in an upflow washing column, dried at 100° C. overnight and then washed again using dilute HCl (7.69 g concentrated HCl diluted to 10 liters) at room temperature and followed by an additional 10 liters of deionized water. The sample was then dried at 100° C. and subsequently calcined at 400° C. in a muffle oven for two hours. The evaluation of this sample in the 1-heptene test of Example 1 showed 52.23 weight percent cracking. This sample contained 2.26 mass percent F.

EXAMPLE 7

A sample of amorphous silica-alumina oil dropped spheres (77.1 g), having the composition 10% $Al_2O_3$/90% $SiO_2$ was slurried in 771 g deionized water. A solution of ammonium hexafluorosilicate (3.77 g) in deionized water (200 g) was added dropwise over the course of 55 minutes to the heated slurry of oil dropped spheres. The reaction temperature was in the range of 79°–83° C. The reaction mixture was then digested at 85° C. for an additional hour before the reaction liquid and fines were decanted. The spheres were loaded into an upflow washing column, washed with 10 liters of room temperature deionized water, dried at 100° C. overnight and calcined at 400° C. for 4 hours. This sample contained 0.37 mass percent F and cracked 73.11 weight percent of the 1-heptene feed in the test of Example 1.

EXAMPLE 8

A sample of amorphous silica-alumina oil dropped spheres having the composition 12% $SiO_2$/88% $Al_2O_3$ was tested in the 1-heptene cracking test of Example 1 and was found to crack only 1% of the 1-heptene Another sample of the amorphous silica-alumina with the composition of 12% $SiO_2$/88% $Al_2O_3$ was impregnated with ammonium fluoride which resulted in a finished silica-alumina material with 1.41% F. This sample was also tested using the cracking test described in Example 1 and was found to have 8.2% cracking activity.

These results show that merely adding fluoride to an amorphous silica-alumina composition does not increase the cracking activity to the level observed for the silicon enhanced amorphous silica-alumina.

We claim as our invention:

1. A hydrocarbon conversion process comprising contacting a hydrocarbon under hydrocarbon conversion conditions with a catalyst to give a hydroconverted product, the catalyst consisting essentially of a silicon enhanced amorphous silica-alumina (SEASAL) composition characterized in that a host amorphous silica-alumina composition has been modified such that from about 3 to about 22 mole percent of the aluminum atoms in the host amorphous silica-alumina have been replaced by silicon atoms and the SEASAL contains from about 0.5 to about 10 weight percent fluoride and has a cracking activity of at least 30%.

2. The process of claim 1 where the hydrocarbon conversion process is hydrocracking.

3. The process of claim 1 where the hydrocarbon conversion process is cracking.

4. The process of claim 1 where the hydrocarbon conversion process is alkylation.

5. The process of claim 1 where the host silica-alumina composition contains from about 20 to about 90% silica and from about 80 to about 10% alumina.

6. The process of claim 1 where the amount of aluminum atoms that have been replaced by silicon vary from about 10 to about 14 mole percent.

* * * * *